US012785490B2

(12) United States Patent
Rodrigo Da Silva et al.

(10) Patent No.: US 12,785,490 B2
(45) Date of Patent: Nov. 3, 2026

(54) DEFLECTOR COVER FOR ROTATING ELECTRIC MACHINE, MODULAR SETS FOR DEFLECTOR COVERS, CORRESPONDING ROTATING ELECTRIC MACHINE AND METHODS OF CONVERTING THE VENTILATION MODE OF A ROTATING ELECTRIC MACHINE

(71) Applicant: WEG Equipamentos Elétricos S/A, Jaraguá do Sul (BR)

(72) Inventors: Gilson Rodrigo Da Silva, João Pessoa (BR); Gabriel De Almeida Pereira, Uberaba (BR); Lucas De Souza, Avaí (BR); Roger Schipmann Eger, Jaraguá do Sul (BR); Alexandre Wentz Zorzi, Jaraguá do Sul (BR)

(73) Assignee: WEG Equipamentos Elétricos S/A, Jaraguá do Sul (BR)

( * ) Notice: Subject to any disclaimer, the term of this patent is extended or adjusted under 35 U.S.C. 154(b) by 284 days.

(21) Appl. No.: 18/491,734

(22) Filed: Oct. 20, 2023

(65) Prior Publication Data

US 2025/0015664 A1 Jan. 9, 2025

(51) Int. Cl.
*H02K 9/06* (2006.01)
*H02K 5/20* (2006.01)
(Continued)

(52) U.S. Cl.
CPC ............... *H02K 5/207* (2021.01); *H02K 9/06* (2013.01); *H02K 9/18* (2013.01); *H02K 15/50* (2025.01);
(Continued)

(58) Field of Classification Search
CPC ........ H02K 9/06; H02K 9/18; H02K 2213/12; H02K 2205/09; H02K 5/207
See application file for complete search history.

(56) References Cited

U.S. PATENT DOCUMENTS

2004/0000821 A1* 1/2004 Ciciliani .................. H02K 9/04 310/58
2011/0169356 A1* 7/2011 Isberg .................... H02K 5/207 310/66
(Continued)

FOREIGN PATENT DOCUMENTS

EP 4362289 A1 * 5/2024 ........... F04D 29/703

OTHER PUBLICATIONS

EP-4362289-A1 Machine Translation (Year: 2022).*

*Primary Examiner* — Oluseye Iwarere
*Assistant Examiner* — Masoud Vaziri
(74) *Attorney, Agent, or Firm* — Wolf, Greenfield & Sacks, P.C.

(57) ABSTRACT

The present invention relates to a deflector cover for a rotating electric machine, comprising a suction region (120) forming an annular crown (121) comprising at least one body portion (122) and a plurality of air passage openings (123), through-going and distributed throughout the surface of the annular crown (121), forming a structure in the form of a perimeter grid and at least one radial opening (124) comprising a frame (125) with attachment points (126). The present invention also relates to a modular self-ventilated set for deflector covers, a modular forced ventilation set for deflector covers, a rotating electric machine, a method of converting the ventilation mode of a self-ventilated rotating electric machine to a forced ventilation mode and to a method of converting the ventilation mode of a rotating electric machine from forced ventilation to a self-ventilated mode.

13 Claims, 12 Drawing Sheets

(51) Int. Cl.
*H02K 9/18* (2006.01)
*H02K 15/50* (2025.01)

(52) U.S. Cl.
CPC ..... *H02K 2205/09* (2013.01); *H02K 2213/12* (2013.01)

(56) References Cited

U.S. PATENT DOCUMENTS

| | | | | |
|---|---|---|---|---|
| 2018/0309343 | A1* | 10/2018 | Tolksdorf | H02K 11/33 |
| 2021/0320552 | A1* | 10/2021 | Truett | H02K 1/32 |
| 2023/0361652 | A1* | 11/2023 | Büttner | F04D 29/5806 |

* cited by examiner

DEFLECTOR COVER FOR ROTATING ELECTRIC MACHINE, MODULAR SETS FOR DEFLECTOR COVERS, CORRESPONDING ROTATING ELECTRIC MACHINE AND METHODS OF CONVERTING THE VENTILATION MODE OF A ROTATING ELECTRIC MACHINE

RELATED APPLICATIONS

The application claims the benefit of Brazilian application number BR 102023013443-2, filed Jul. 4, 2023. The entire contents of which are incorporated herein by reference in its entirety.

FIELD OF APPLICATION

The present invention relates to the field of rotating electric machines, in particular arrangements for air cooling or ventilation of rotating electric machines.

BACKGROUND OF THE INVENTION

Rotating electric machines are equipment used for transforming electric energy into mechanical energy, in the case of motors, and for transforming mechanical energy into electric energy, in the case of generators. Basically, rotating electric machines comprise four main structures, which are housing, stator, rotor and bearings/caps.

The housing is a static element responsible for integrating the structures of the rotating electric machine.

The stator is the static active (energized) component responsible for transmitting the magnetic flux for rotating the rotor, in the case of motors, and for transmitting the energy generated by the rotor, in the case of generators, whereas the rotor is the active (energized) component of the rotating electric machine.

The rotor, in turn, basically comprises a shaft onto which one or more cages, coils, or permanent magnets are arranged, depending on the construction type and operating principle of the rotating electric machine.

The bearings are the elements responsible for coupling the rotating parts to the static parts of a rotating electric machine, performing, for example, the coupling, bearing, and centralization of the (rotating) rotor in relation to the (static) stator, allowing for relative movement between rotor and stator, as well as transmitting forces therebetween.

In addition to such elements, depending on the distinct features of each rotating electric machine, there may also be auxiliary systems such as air cooling or ventilation, which are essentially divided into self-ventilation systems, coupled to the rotating elements of the electric machine, and forced ventilation, which use elements external to the rotating electric machine and are coupled to elements fixed therein.

Self-ventilated systems typically have one or more fans coupled to the rotor shaft which capture air at room temperature from the external surroundings of the electric machine and, in association with deflector devices covering and surrounding them, blow said air towards the electric machine's housing. The air current externally passes over the housing and between its fins, in the case of "closed housing" motors (closed back cap), and internally and/or externally in the case of "open housing" motors (back cap with openings), promoting thermal exchange and removing part of the heat generated during operation.

Forced ventilation air cooling systems, on the other hand, use one or more external devices provided with fans or turbines, which capture external air and blow it into the housing and/or a deflector, which will guide the air flow to promote the intended heat exchange.

In addition to the normal heating of a rotating electric machine, some applications subject the machines to additional stress that generates even more heat and, in either situation, an efficient heat exchange is essential. Thus, rotating electric machines demand highly efficient cooling solutions to withstand the heating resulting from their operation.

Given that rotating electric machines operate under a myriad of different rotating conditions, mechanical loads, and temperatures, and given that the heat exchange in air-cooled electric machines increases according to the temperature differential and the volume of moved air, cooling challenges and imposes limits on electric motor manufacturers beyond size and power limitations.

The restrictions also include the degree of protection and noise attenuation, since insulating against impurities, bad weather, and noise goes directly against the heat exchange between the electric machine and its surroundings, demanding a compromise between the variables which not always fully satisfies design requirements.

Another need is the construction of deflector covers which allow for ventilation modularity, allowing the same rotating electric machine to operate both in a self-ventilated mode and with forced ventilation, e.g., through a simple and practical change in ventilation regime.

In addition to ventilation modularity, the possibility of providing a deflector cover which allows coupling devices or equipment onto the rotating parts of the electric machine, such as, for example, the rotor shaft, is also increasingly necessary.

Indeed, there remains the need of constructing of increasingly structurally resistant deflector covers, while at the same time reducing mass, which also results in the need to optimize the deflector covers' geometry to save material and also improve air flow, whilst also meeting the safety standards stipulated for this type of product.

The challenge lies therefore in designing robust and lightweight air deflector covers, which promote heat exchange both in a self-ventilated regime and in a forced ventilation regime, by means of simple procedures in a single deflector cover, and which can be easily assembled and disassembled, both geometrically and positionally stable. The deflector covers must also be capable of withstanding the forces imposed onto the structure by the equipment or forced ventilation devices and a myriad of handling conditions (factory assembly, packaging, transport) and of operation of the electric machine (vibration, torque, variations in temperature, accidental physical contact and so on), whilst at the same time being simple to build and manufacture, optimizing both the use of raw materials and the manufacturing and assembly process.

STATE OF THE ART

There are several solutions in the state of the art for covers and deflector devices for self-ventilated or forced-ventilated rotating electric machines.

One example is patent document EP 2166647, which discloses and describes a self-ventilated traction motor comprising an elongation ring adapted for use on a self-ventilated traction motor and to be fixedly placed between the non-driving end of the motor housing and a motor end cap. The ring has radial air outlet openings placed throughout its circumference and is adapted to surround a fan wheel attached onto the motor's drive shaft. The invention also relates to a traction motor comprising such an elongation ring.

Although the elongation ring offers the possibility of adapting a motor housing to a self-ventilated motor with a ring or to a forced ventilation motor without the ring, do note, that for this invention to work as intended, the system depends on the production of a new component, i.e., the elongation ring, which necessarily needs to be installed between the cap and the motor housing, which results in increased installation/maintenance costs for this invention, in addition to subjecting the motor and its components to many installation procedures that may result in damage to its structure or loss of warranty.

As can be seen from the above description, there is room and demand for a deflector cover solution for rotating electric machines that overcomes the disadvantages of the state of the art, in particular robust and simple deflector covers that can be easily and quickly assembled and disassembled without the use of tools or devices and that, after assembled, are geometrically and positionally stable.

OBJECTS OF THE INVENTION

Therefore, one of the objects of the present invention is providing a deflector cover for a rotating electric machine according to the features of claim 1 of the appended set of claims.

Yet another object of the present invention is providing a modular self-ventilated set for deflector covers according to the features of claim 4 of the appended set of claims.

Yet another object of the present invention is providing a modular forced ventilation set for deflector covers according to the features of claim 6 of the appended set of claims.

A further object of the present invention is providing a corresponding rotating electric machine according to the features of claim 8 of the appended set of claims.

Another objective of the present invention is providing a method of converting the ventilation mode of a self-ventilated rotating electric machine to a forced ventilation mode according to the features of claim 9 of the appended set of claims.

Yet another objective of the present invention is providing a method of converting the ventilation mode of a forced ventilation rotating electric machine to a self-ventilated mode according to the features of claim 10 of the appended set of claims.

Additional features and details thereof are presented in the dependent claims.

BRIEF DESCRIPTION OF THE DRAWINGS

For a better understanding and visualization of the object to which the invention relates, it will now be described with reference to the accompanying figures, representing the obtained technical effect by means of an exemplary embodiment without limiting the scope of the present invention, in which, schematically.

DETAILED DESCRIPTION OF THE INVENTION

Figure 1:
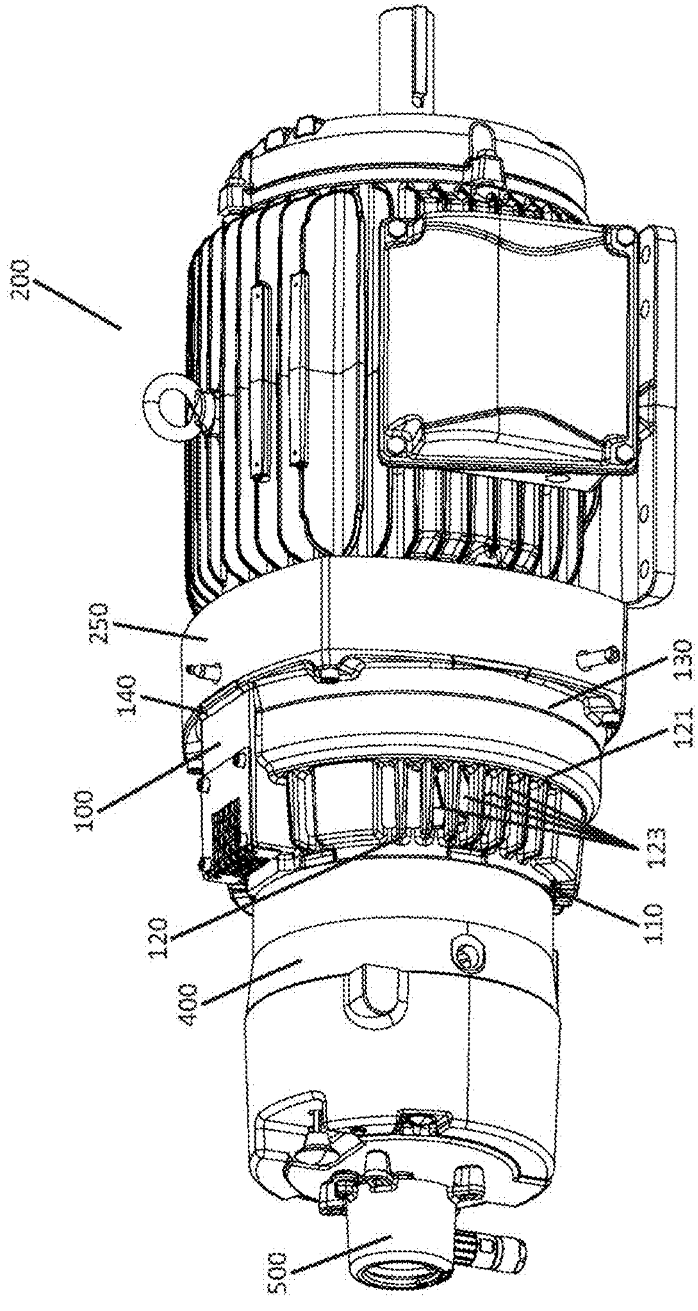
FIG. 1 shows a perspective view of a rotating electric machine comprising a deflector cover according to the invention.
Figure 2:
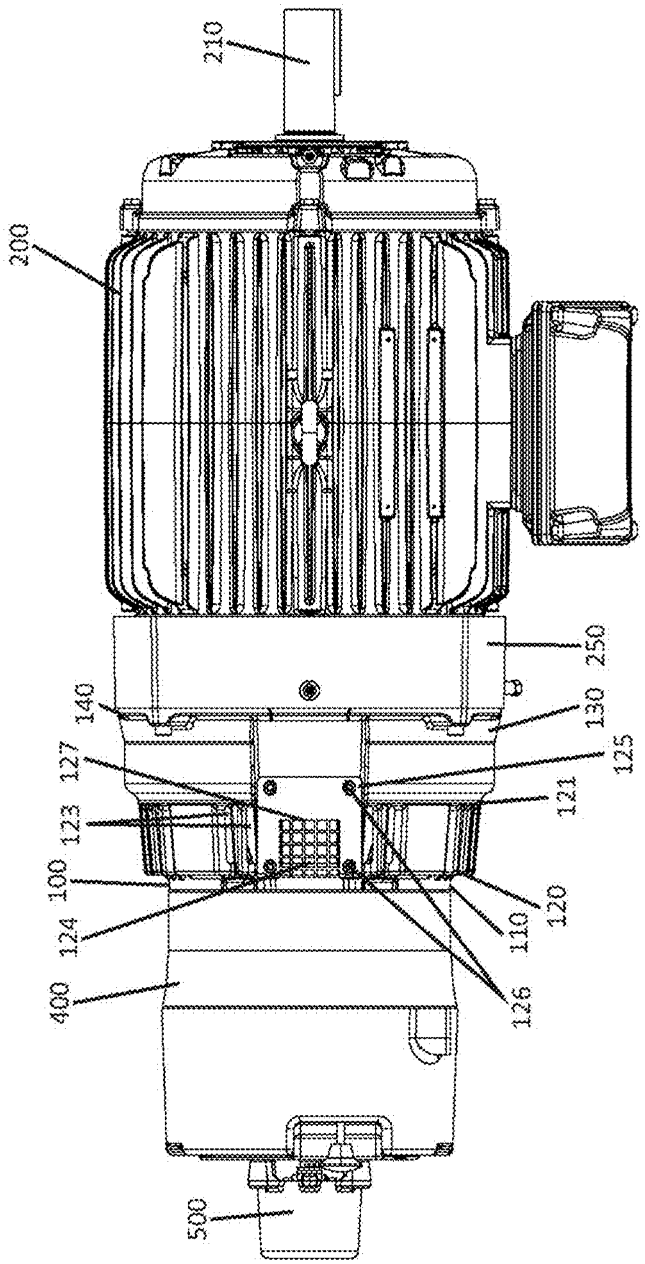
FIG. 2 shows a top view of the rotating electric machine in FIG. 1.
Figure 3:
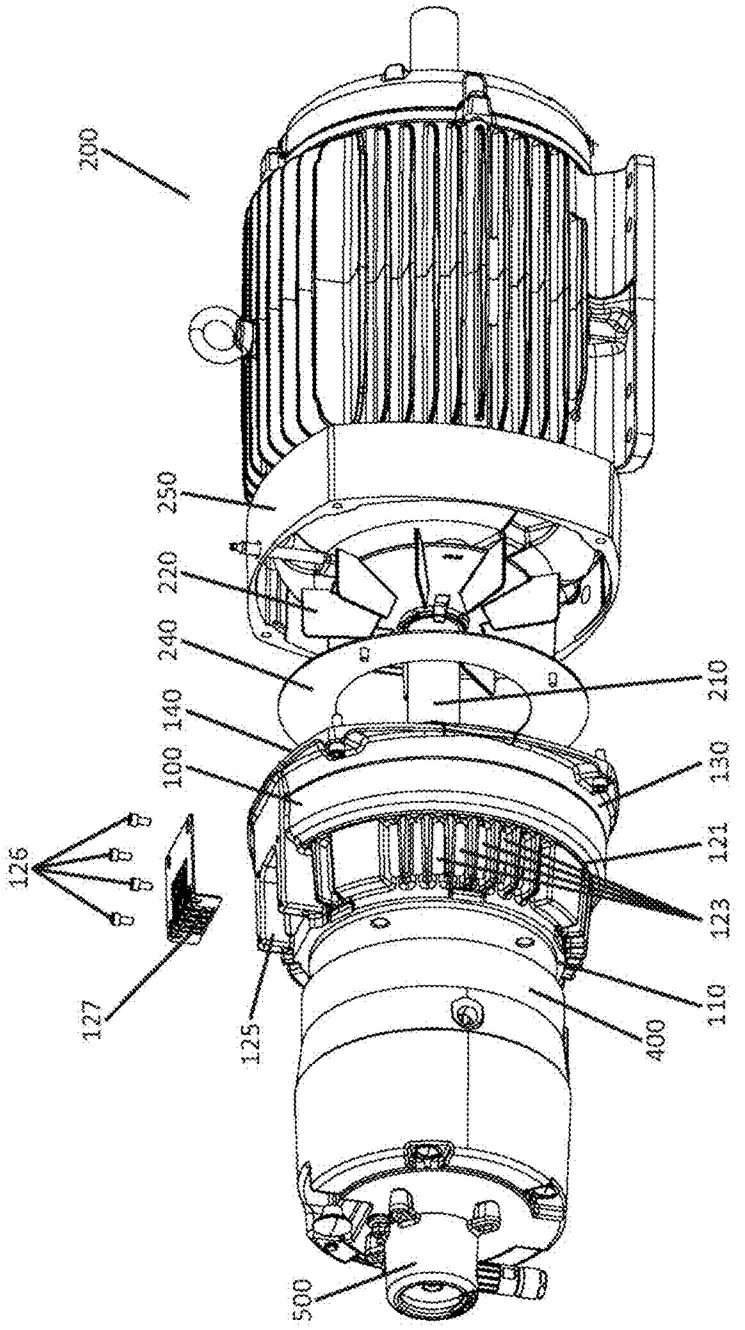
FIG. 3 shows an exploded view of the rotating electric machine in FIG. 1.
Figure 4:
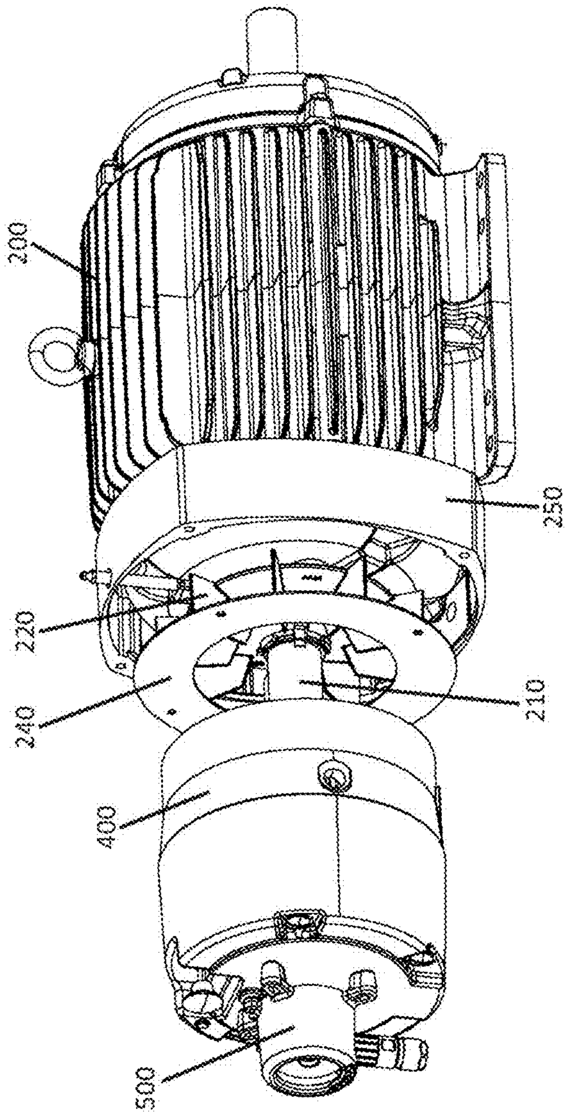
FIG. 4 shows a perspective view of the rotating electric machine in FIG. 1 without the deflector cover and additionally comprising an internal deflector.
Figure 5:
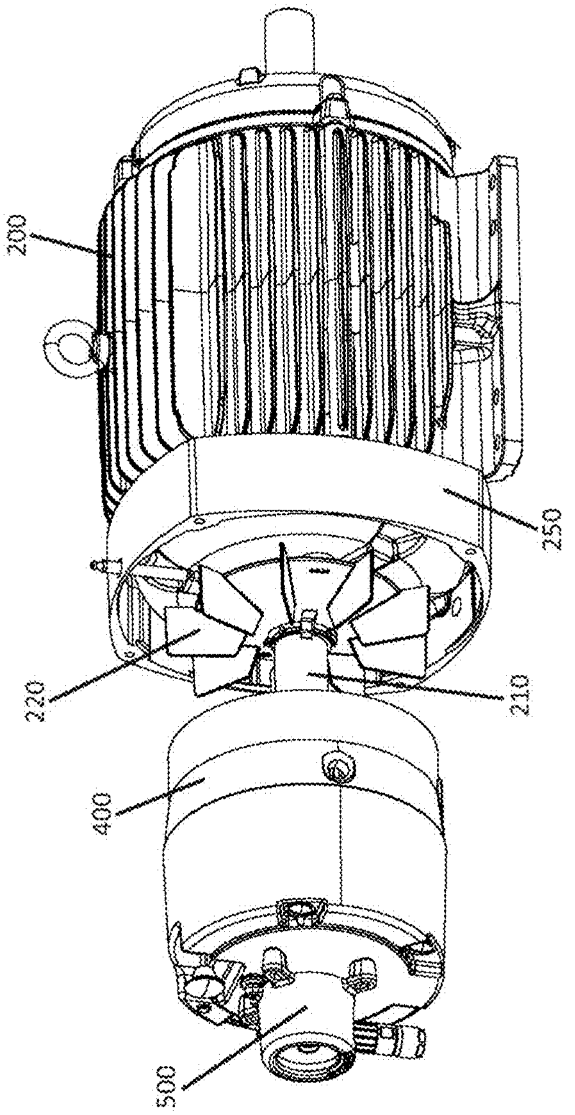
FIG. 5 shows a perspective view of the rotating electric machine in FIG. 4 without the internal deflector.
Figure 6:
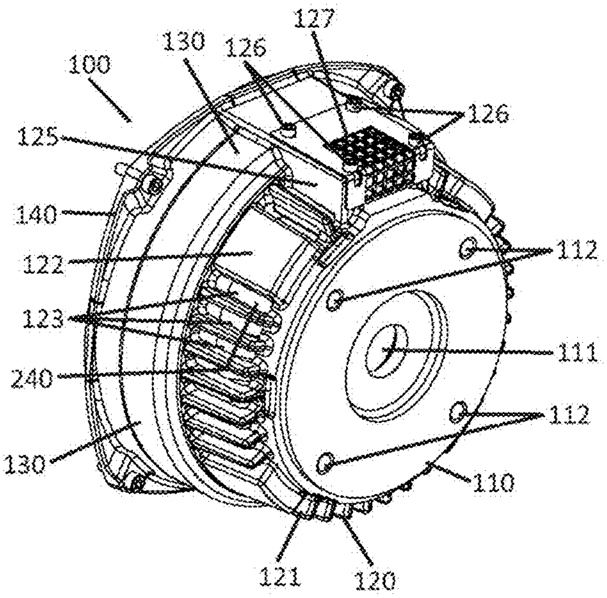
FIG. 6 shows a perspective view of a deflector cover according to the invention.
Figure 7:
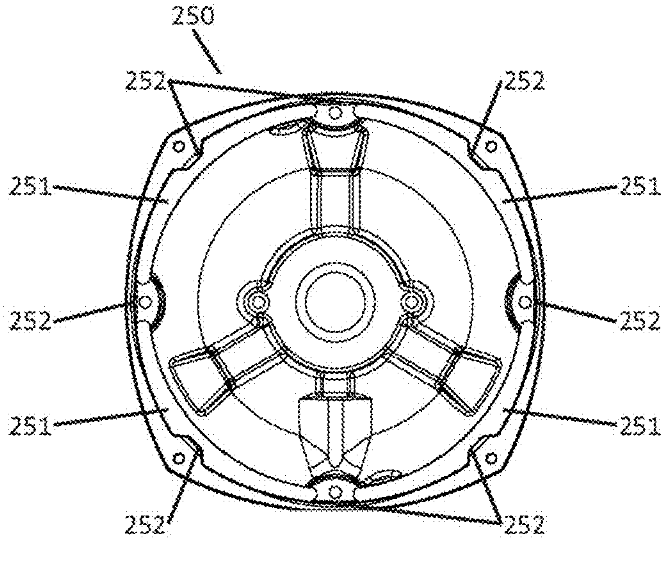
FIG. 7 shows a rear view of a coupling piece of the deflector cover according to the invention.
Figure 8:
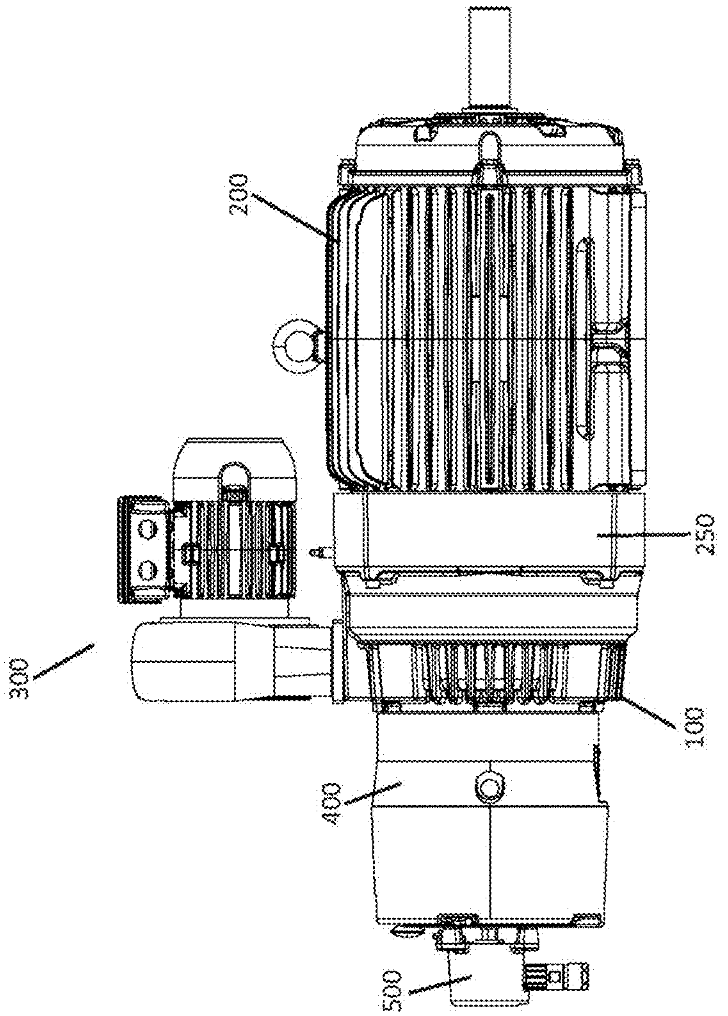
FIG. 8 shows a side view of a rotating electric machine comprising a deflector cover and a forced ventilation device according to the invention.
Figure 9:
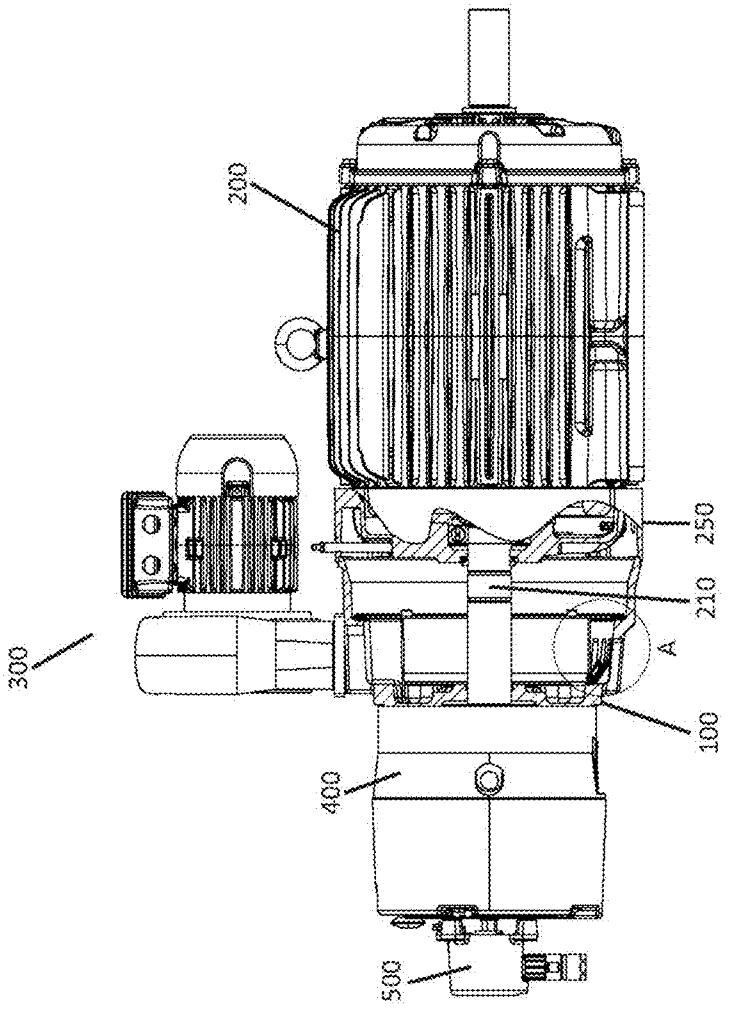
FIG. 9 shows a side view of the rotating electric machine in FIG. 8 with a partial cut and a detail A, showing the rubber profile.
Figure 10:
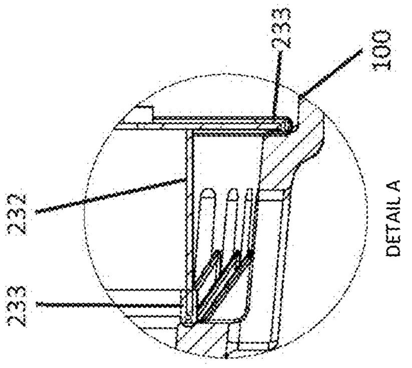
FIG. 10 shows a side view of detail A of the rotating electric machine in FIG. 9.
Figure 11:
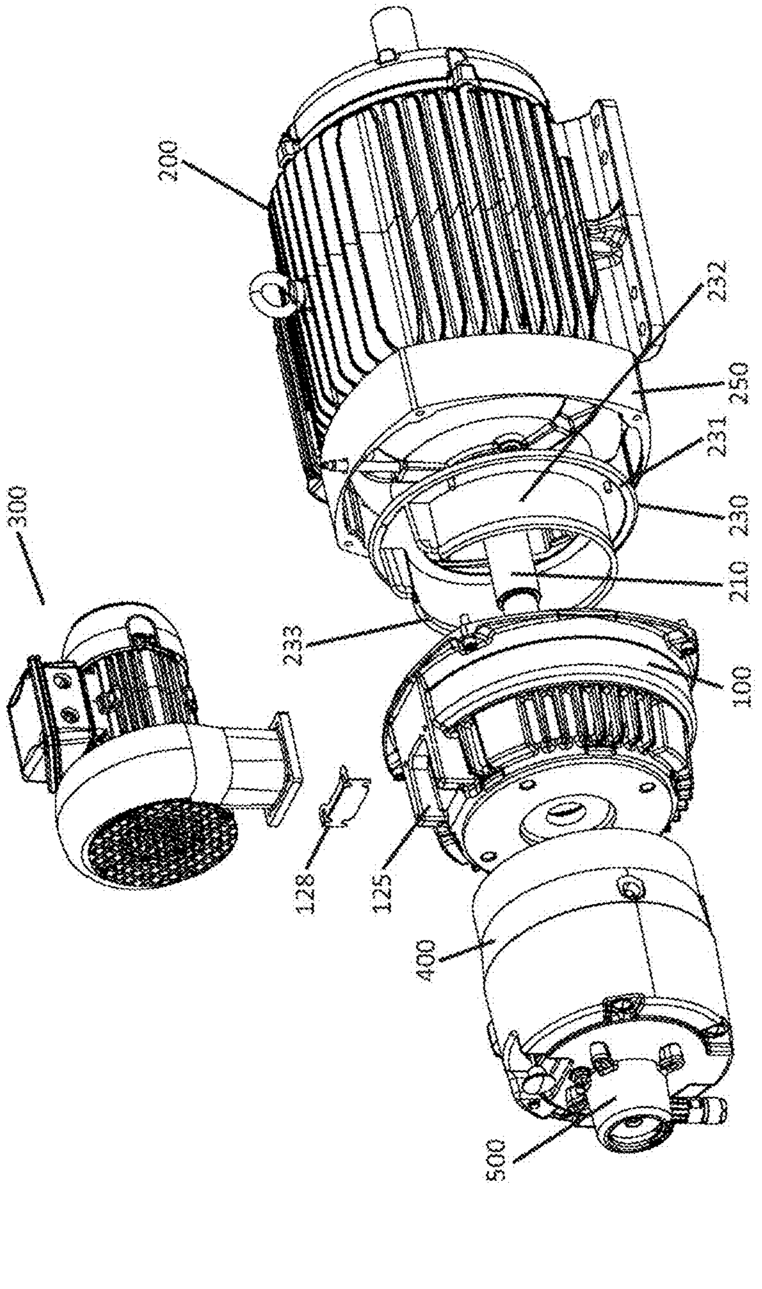
FIG. 11 shows an exploded view of the rotating electric machine in FIG. 8.
Figure 12:
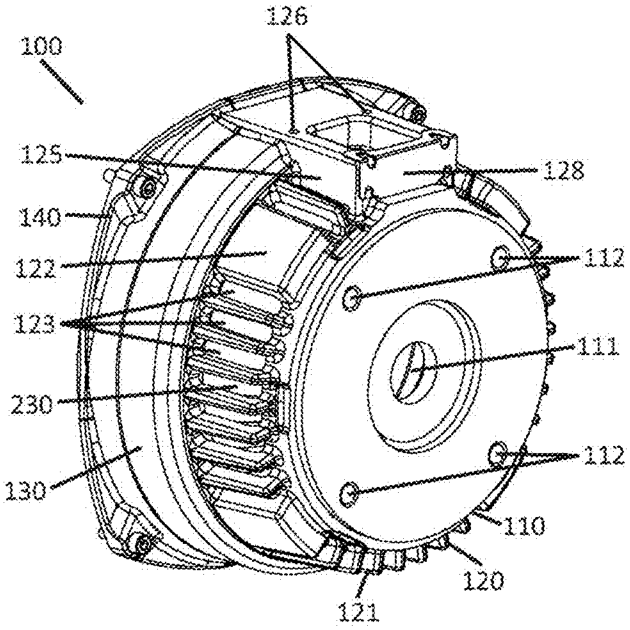
FIG. 12 shows a perspective view of the deflector cover of FIG. 8.
Figure 13:
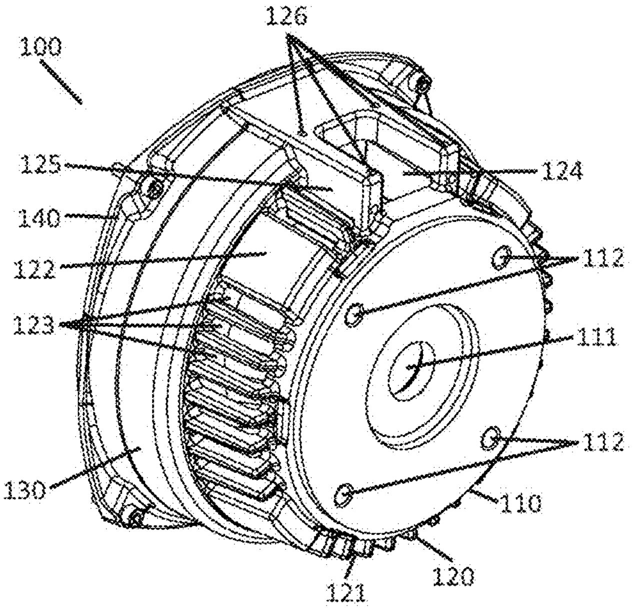
FIG. 13 shows a perspective view of a deflector cover according to the invention.
Figure 14:
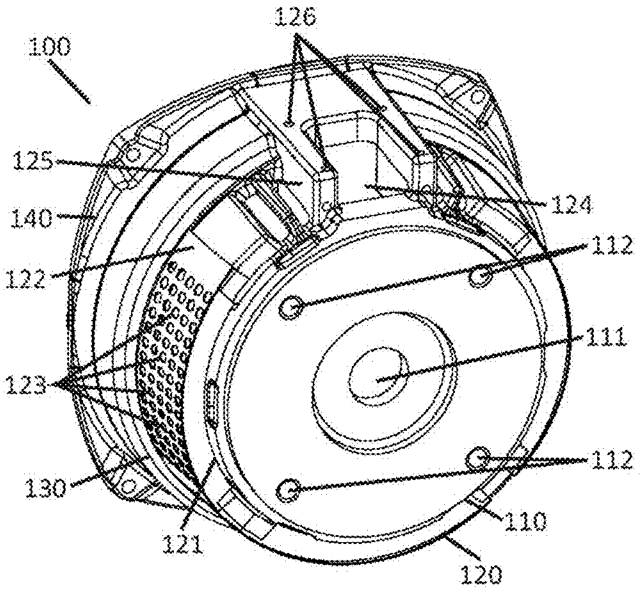
FIG. 14 shows a perspective view of a deflector cover according to the invention.
Figure 15:
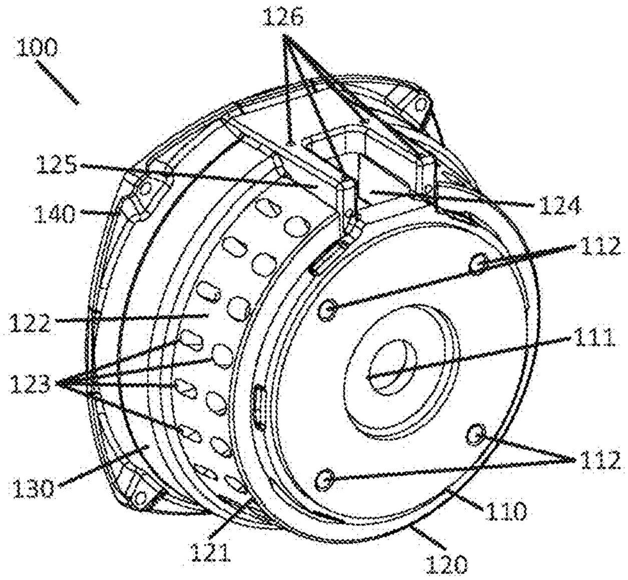
FIG. 15 shows a perspective view of a deflector cover according to the invention.
Figure 16:
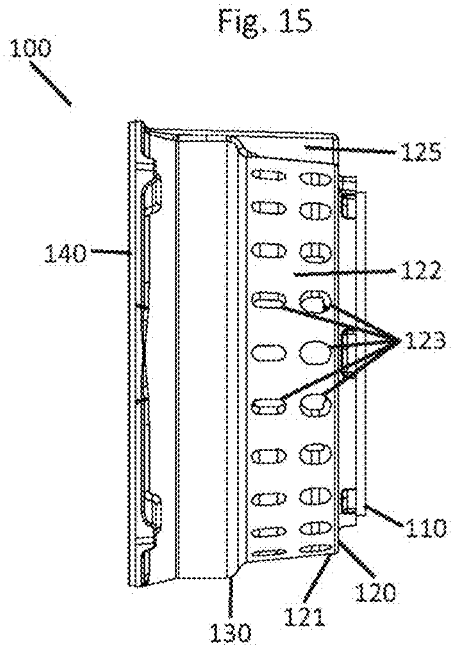
FIG. 16 shows a side view of the deflector cover of FIG. 15.

The present invention relates to a deflector cover (100) for application in cooling or ventilation systems of self-ventilated or forced ventilation rotating electric machines (200), in which the deflector cover (100) is preferably formed as a single piece, channeling and guiding the air moved both by fan(s) or blower(s) of self-ventilated cooling systems or by forced ventilation devices.

The deflector cover (100) of the invention comprises a rear coupling region (110), a suction region (120), a guiding region (130) and an anterior engagement region (140), axially adjacent to each other, each in that order, in which the deflector cover (100) is assembled onto one or more fixed parts of the rotating electric machine (200).

The rear coupling region (110) is the rear end region of the deflector cover (100) and comprises a face perpendicular to an rotor shaft (210) of the rotating electric machine (200), at least one central opening (111) for the rotor shaft (210) to pass and at least one hole (112) which allows for attaching additional devices or equipment which can be coupled to the rotor shaft (210), such as, for example, without limiting the scope of the present invention, an electromechanical brake (400), electromechanical sensors as a encoder (500), optical sensors, reducers, transmission boxes (not shown) and other usual devices or equipment for application in rotating electric machines (200) of the type addressed herein. It should be noted that, in the context of the present invention, the rotor shaft (210) corresponds to the longitudinal axis of the rotating electric machine (200).

The suction region (120), axially adjacent to the upstream rear coupling region (110) and axially adjacent to the downstream guiding region (130), forms an annular crown (121) concentric to the rotor shaft (210), in which the annular crown (121) comprises:

at least one body portion (122), a plurality of air passage openings (123), through-going and distributed throughout the surface of the annular crown (121), forming a structure in the form of a perimeter grid; and at least one through-going radial opening (124), comprising a frame (125) with attachment points (126) for coupling at least one forced ventilation device (300).

In the context of the present invention, the term "perimeter grid" can also refer to a "perimeter grate", always being used to describe a structure which comprises a plurality of air passage openings (123) separated from each other throughout the suction region (120). Thus, the terms "perimeter grid", "perimeter grate", or other terms should not be interpreted as terms limiting the present invention.

The air passage openings (123) are distributed throughout the surface of the annular crown (121) preferably equidistant from each other, and may also be distributed non-equidistantly from each other or even in a combination of these two modes. In addition, the air passage openings (123) are through-going and thus reversibly constructed, so as to be partially or preferably integrally closed, both from the outside and from the inside of the suction region (120).

Furthermore, the air passage openings (123) may have any suitable shape, which may be, without limiting the scope of the invention, round, ellipsoid, polygonal, curved, slotted and the like or even a combination of said shapes. The added area of the air passage openings (123) represents a total open area equivalent to a value between 40% and 80%, preferably between 60% and 80% of the total surface area value of the annular crown (121) minus the open area of the radial opening (124), so as to ensure adequate air flow to cool the housing of the rotating electric machine (200) and, at the same time, prevent access to the rotating internal parts of the rotating electric machine (200), ensuring the safety required for electric motors of the type addressed herein.

The frame (125) of the suction region (120) is sized and shaped corresponding to the forced ventilation device (300). If the rotating electric machine (200) is used in self-ventilating mode, the radial opening (124) is preferably equipped with a protection grid (127) attached to the attachment points (126). It should be noted that, as in the body portion (122), the protection grid (127) prevents access to the moving parts of the rotating electric machine (200). It should also be noted that the total open area of the protection grid (127) corresponds to a value between 40% and 80%, preferably between 60% and 80% of the total surface area value of the annular crown (121).

The guiding region (130), axially adjacent to the suction region (120), guides the air drawn in by at least one internal fan (220) through the annular crown (121), in the case of self-ventilated machines, or blown by a forced ventilation device (300) coupled to the radial opening (124), in the case of forced ventilation machines, towards the housing of the rotating electric machine (200).

The anterior engagement region (140), axially adjacent to the guiding region (130), is the front-end region of the deflector cover (100) and comprises a face perpendicular to the rotor shaft (210) and at least one hole (not shown), which receives an attachment means, e.g., screws, rivets, pins, among others, to couple the deflector cover (100) directly to the housing or indirectly to a coupling piece (250) of the rotating electric machine (200).

The rotating electric machine (200) is preferably an electric motor comprising at least one deflector cover (100), a rotor shaft (210) and at least one coupling piece (250), the rotating electric machine (200) can receive at least one internal deflector (230, 240).

The internal deflector (230) comprises a deflector base (231) and a deflector belt (232). Its attachment on the deflector cover (100) can carried out in different manners, such as, but not limited to, screws, assembly by interference between the two components, or any other suitable means which ensures a firm attachment between the internal deflector (230) and deflector cover (100).

The deflector base (231) has an internal diameter so as to allows the air to be more homogeneously directed to the coupling piece (250), through the air passage openings (251) towards the housing of the rotating electric machine (200).

In a preferred embodiment of the invention, the deflector base (231) has a concentric central opening with an internal diameter or air passage equivalent to a value between 50 and 70% of the total external diameter of the deflector base (231).

The deflector belt (232) has an axial dimension which can prevent air from escaping through the air passage openings (123), redirecting the air captured out of the deflector cover (100) towards the housing of the rotating electric machine (200).

The deflector belt (232) has an axial sizing suitable for closing the air passage openings (123), said sizing ranging according to the geometry of the deflector cover (100).

Depending on the sizing accuracy and the components' manufacturing process, using a sealing element, for example, but not limited to, at least one rubber profile (233), or a liquid sealant may be needed in the interfaces between the deflector belt (232) and deflector cover (100). If the components are accurately sized, only a continuous slot, in which large gaps cannot be found in the pieces, is enough to prevent the air from escaping.

Alternatively, depending on how the deflector cover (100) is manufactured, such as by casting or injection, an additional sheet (128) to close the frame (125) may be necessary. Said additional sheet (128) has a shape suitable for closing the opening, being limited only to the design of the deflector cover (100).

The internal deflector (240) is a preferably disk-shaped piece with an external diameter such that it can direct the captured air towards the housing of the rotating electric machine (200), preventing the air from flowing towards the rear coupling region (110) from the deflector cover (100). Its attachment to the deflector cover (100) is carried out similarly to the internal deflector (230).

The coupling piece (250) comprises at least one air passage opening (251), wherein said air passage opening (251) exhausts and discharges the air moving towards the casing, in particular the surface external part of the rotating electric machine (200) in the case of "closed housing" electric machines and/or to the internal surfaces of the housing in the case of "open housing" electric machines.

Furthermore, the coupling piece (250) may comprise a plurality of slots (252), which assist in centering the deflector cover (100) in relation to the structure of the rotating electric machine (200).

The coupling piece (250) can be the motor's back closing cap, the motor housing or a structure external to the motor, without, however, limiting the invention.

The forced ventilation device (300) is a device that acts independently of the rotating electric machine (200), intended to capture air external to the rotating electric machine (200) and push it at high speed into the deflector cover (100) and, subsequently, through the air passage openings (251) of the coupling piece (250). It should be noted that the forced ventilation device (300) can be any typical prior art forced ventilation device.

The present invention also relates to a modular self-ventilated set and a modular forced ventilation set for deflector covers.

The modular self-ventilated set for deflector covers is used to operate the rotating electric machine (200) in self-ventilated mode, comprising at least one deflector cover (100), an internal fan (220), an internal deflector (240) and at least one protection grid (127), the internal fan (220) being a fan coupled to the rotor shaft (210) which draws in air through the suction region (120) and expels said air out of the deflector cover (100) through the air passage openings (251) from the coupling piece (250) towards the external and/or internal surface of the rotating electric machine (200).

The modular forced ventilation set for deflector covers is used for operating the rotating electric machine (200) in forced ventilation mode, comprising at least one deflector cover (100), an internal deflector (230) and at least one forced ventilation device (300), the internal deflector (230) being concentric to the rotor shaft (210) and arranged inside deflector cover (100) so as to close the air passage openings (123), i.e., completely caping the annular crown (121), preventing the air captured and insufflated by the forced ventilation device (300) from escaping through the air passage openings (123).

Regardless of the chosen type of ventilation, i.e., self-ventilated or forced ventilation system, the deflector cover (100) can be easily adapted by means of modular sets, both for converting a self-ventilated system to a forced ventilation system and for converting a forced ventilation system into a self-ventilated system, by using components that easily couple to the rotating electric machine (200) without having to structurally change it.

The present invention also relates to a method of converting the ventilation mode of a self-ventilated rotating electric machine (200) to a forced ventilation mode, comprising the following steps:

I) disassembling a deflector cover (100) from a coupling piece (250);

II) disassembling a protection grid (127) from the deflector cover (100);

III) disengaging an internal deflector (240) from the deflector cover (100);

IV) disassembling an internal fan (220) from a rotor shaft (210);

V) coupling an internal deflector (230) to the deflector cover (100);

VI) assembling a forced ventilation device (300) to a frame (125) by means of a plurality of attachment points (126); and VII) reassembling the deflector cover (100) to the coupling piece (250).

The present invention also describes a method of converting the ventilation mode of a rotating electric machine (200) from forced ventilation to a self-ventilated mode, comprising the following steps:

I) disassembling a deflector cover (100) from a coupling piece (250);

II) disassembling a forced ventilation device (300) from a frame (125) by means of a plurality of attachment points (126);

III) disengaging an internal deflector (230) from the deflector cover (100);

IV) assembling an internal fan (220) to a rotor shaft (210);

V) coupling an internal deflector (240) to the deflector cover (100);

VI) assembling a protection grid (127) to the deflector cover (100); and VII) reassembling the deflector cover (100) to the coupling piece (250).

The material of the deflector cover (100) must be a resilient, robust, and resistant material, which can withstand extreme temperature values and variations, preferably chosen from, but not limited to, the group of cast iron alloys, and can be made of only one material or from a combination of one or more materials, including other metals or thermoplastic polymers.

Thus, it remains clear that the deflector cover (100) of the invention overcomes the disadvantages of the relevant state of the art, providing a robust and lightweight deflector cover, having an optimized geometry with a lower manufacturing cost, an optimized air flow distribution, and which can easily be modularly installed in a self-ventilated system to be converted to a forced ventilation system or vice versa.

Finally, a rotating electric machine (200) according to the invention is an electric motor provided with at least one deflector cover (100) and comprising one or more internal fans (220) of the self-ventilated system or a forced ventilation device (300) according to the invention. Thanks to this new deflector cover (100), the rotating electric machine (200) becomes can be assembled with various accessories in a modular manner, such as: an electromechanical brake (400), a encoder (500), among others.

CONCLUSION

It will be easily understood by one skilled in the art that modifications may be made to the present invention without departing from the concepts set out in the description above. Such modifications should be considered as included within the scope of the present invention. Consequently, the particular embodiments previously described in detail are illustrative and exemplary only and are non-restrictive as to the scope of the present invention, which should be given the full extent of the appended claims and any and all equivalents thereof.

The invention claimed is:

1. A deflector cover for a rotating electric machine, said deflector cover comprising a suction region forming an annular crown comprising:

at least one body portion and a plurality of air passage openings, through-going and distributed throughout a surface of the annular crown, forming a perimeter grid structure; and at least one radial opening comprising a frame with attachment points and providing access to moving parts of the rotating electric machine through an open area.

2. The deflector cover according to claim 1, wherein the suction region is axially adjacent to an upstream rear coupling region and a downstream guiding region.

3. The deflector cover according to claim 1, wherein a summed area of the plurality of air passage openings represents a total open area that is equivalent to a value between 40% and 80% of a total surface area value of the annular crown minus the open area of the at least one radial opening.

4. The deflector cover according to claim 3, wherein the value is between 60% and 80% of the total surface area value.

5. A modular self-ventilated set comprising:

the deflector cover of claim 1, an internal fan, an internal deflector, and at least one protection grid, wherein the internal fan is configured to couple to a rotor shaft which:

draws in air through the suction region, and ejects air out of the deflector cover through air passage openings of a coupling piece towards a surface of a rotating electric machine.

6. The modular self-ventilated set according to claim 5, wherein a summed open area of the at least one protection grid corresponds to a value between 40% and 80% of a total surface area value of the annular crown.

7. The modular self-ventilated set for a deflector cover according to claim 6, wherein the value is between 60% and 80% of the total surface area value.

8. A rotating electric machine comprising:

the modular self-ventilated set according to claim 5, the rotor shaft, and the coupling piece.

9. A modular forced ventilation set for deflector covers, comprising:

the deflector cover according to claim 1, an internal deflector, and at least one forced ventilation device, wherein the internal deflector is concentric to a rotor shaft and arranged inside the deflector cover so as to close the plurality of air passage openings.

10. The modular forced ventilation set according to claim 9, wherein a deflector base of the internal deflector has a concentric central opening with an internal diameter of air passage equivalent to a value between 50 and 70% of a total external diameter of the deflector base.

11. A rotating electric machine comprising:

the modular forced ventilation set according to claim 9, and the rotor shaft, and at least one coupling piece.

12. A method of converting a ventilation mode of a self-ventilated rotating electric machine to a forced ventilation mode, said method comprising:

I) disassembling a deflector cover as defined in claim 1 from a coupling piece;

II) disassembling a protection grid from the deflector cover;

III) disengaging an internal deflector from the deflector cover;

IV) disassembling an internal fan from a rotor shaft;

V) coupling an internal deflector to the deflector cover;

VI) assembling a forced ventilation device to a frame by means of a plurality of attachment points; and VII) reassembling the deflector cover to the coupling piece.

13. A method of converting the ventilation mode of a rotating electric machine from forced ventilation to a self-ventilated mode, said method comprising:

I) disassembling a deflector cover as defined in claim 1 from a coupling piece;

II) disassembling a forced ventilation device from a frame by means of a plurality of attachment points;

III) disengaging an internal deflector from the deflector cover;

IV) assembling an internal fan to a rotor shaft;

V) coupling an internal deflector to the deflector cover;

VI) assembling a protection grid to the deflector cover; and

VII) reassembling the deflector cover to the coupling piece.

* * * * *